US011067471B2

United States Patent
Bianchi et al.

(10) Patent No.: US 11,067,471 B2
(45) Date of Patent: Jul. 20, 2021

(54) DEVICE AND METHOD FOR CHECKING POUCHES FOR FILLING LINES

(71) Applicant: FILLSHAPE SRL, Zola Predosa (IT)

(72) Inventors: Paolo Bianchi, Parma (IT); Filippo Furlotti, Frazione Cazzola (IT); Luca Signifredi, Frazione Sivizzano (IT)

(73) Assignee: I.M.A. INDUSTRIA MACCHINE AUTOMATICHE S.P.A., Ozzano Dell'emilia (IT)

( * ) Notice: Subject to any disclaimer, the term of this patent is extended or adjusted under 35 U.S.C. 154(b) by 244 days.

(21) Appl. No.: 16/321,352

(22) PCT Filed: Jul. 26, 2017

(86) PCT No.: PCT/IB2017/054539
§ 371 (c)(1),
(2) Date: Jan. 28, 2019

(87) PCT Pub. No.: WO2018/020438
PCT Pub. Date: Feb. 1, 2018

(65) Prior Publication Data
US 2019/0178747 A1 Jun. 13, 2019

(30) Foreign Application Priority Data
Jul. 28, 2016 (IT) .................. 102016000079175

(51) Int. Cl.
*G01M 3/32* (2006.01)
*G01M 3/34* (2006.01)

(52) U.S. Cl.
CPC .......... *G01M 3/3218* (2013.01); *G01M 3/329* (2013.01); *G01M 3/3254* (2013.01); *G01M 3/34* (2013.01)

(58) Field of Classification Search
CPC ........ G01M 3/34; G01M 3/02; G01M 3/3218; G01M 3/3263
See application file for complete search history.

(56) References Cited

U.S. PATENT DOCUMENTS 2,232,711 A * 2/1941 Maher ................. G01M 3/3281
73/45.2
2,391,351 A * 12/1945 Schmidt ................. G01M 3/04
73/45.5
(Continued)

FOREIGN PATENT DOCUMENTS

EP 2213997 A1 8/2010
GB 1350429 A * 4/1974 .......... G01M 3/3281
(Continued)

OTHER PUBLICATIONS

Machine Translation of JP-2000035373-A Which Originally Published on Feb. 2, 2002. (Year: 2002).*
(Continued)

*Primary Examiner* — David A. Rogers
(74) *Attorney, Agent, or Firm* — Cantor Colburn LLP

(57) ABSTRACT

A device for checking pouches adapted to contain a substance such as a liquid, a powder or a purée, includes at least one carousel adapted to convey the pouches, supporting them along its peripheral region, and at least one duct for supplying a test fluid that is connected to at least one nozzle insertable in a respective pouch conveyed by the carousel. The device further includes elements for detecting a variation in the pressure and/or flow rate of the test fluid in the supply duct after the test fluid has been supplied to, or drawn from, the pouch through the duct and the nozzle.

12 Claims, 5 Drawing Sheets

(56) References Cited

U.S. PATENT DOCUMENTS

| | | | | |
|---|---|---|---|---|
| 2,399,391 A * | 4/1946 | Clyded | G01M 3/366 | |
| | | | 73/45.4 | |
| 2,433,043 A * | 12/1947 | Gray | G01M 3/3281 | |
| | | | 73/45.2 | |
| 3,091,958 A * | 6/1963 | Robins | G01M 3/3272 | |
| | | | 73/45.2 | |
| 3,290,922 A * | 12/1966 | Roberto | G01M 3/24 | |
| | | | 73/52 | |
| 3,307,390 A * | 3/1967 | Behrens | G01M 3/3236 | |
| | | | 73/45.2 | |
| 3,462,014 A * | 8/1969 | Sher | F15C 1/005 | |
| | | | 209/552 | |
| 3,489,275 A * | 1/1970 | Powers, Jr. | B07C 5/3404 | |
| | | | 209/523 | |
| 3,683,676 A * | 8/1972 | Hass | F15C 1/005 | |
| | | | 73/45.1 | |
| 3,683,677 A * | 8/1972 | Harris | G01M 3/3218 | |
| | | | 73/49.2 | |
| 3,716,910 A * | 2/1973 | Eggert | B07C 5/3408 | |
| | | | 29/563 | |
| 3,762,213 A * | 10/1973 | Nowicki | G01M 3/34 | |
| | | | 73/45.3 | |
| 3,785,195 A * | 1/1974 | Yasuhiro | G01N 3/12 | |
| | | | 73/37 | |
| 3,795,137 A * | 3/1974 | Lo | G01M 3/24 | |
| | | | 73/45.4 | |
| 3,805,593 A * | 4/1974 | Sandoz | G01M 3/3218 | |
| | | | 73/49.2 | |
| 3,805,594 A * | 4/1974 | Hayashi | G01N 3/12 | |
| | | | 73/49.2 | |
| 3,879,987 A * | 4/1975 | Yasuhiro | G01N 3/12 | |
| | | | 73/37 | |
| 3,894,424 A * | 7/1975 | Taylor | G01N 3/12 | |
| | | | 73/49.2 | |
| 3,938,368 A * | 2/1976 | Eberle | G01M 3/3236 | |
| | | | 73/45.1 | |
| 4,019,370 A | 4/1977 | Allocco, Jr. | | |
| 4,107,977 A * | 8/1978 | Grinberg | G01M 3/02 | |
| | | | 73/45.3 | |
| 4,291,573 A * | 9/1981 | Richter | G01M 3/3236 | |
| | | | 209/522 | |
| 4,459,843 A * | 7/1984 | Durham | G01M 3/3236 | |
| | | | 73/37 | |
| 4,637,249 A * | 1/1987 | Ishizaki | G01M 3/3236 | |
| | | | 73/41 | |
| 4,756,184 A * | 7/1988 | Reishus | G01M 3/36 | |
| | | | 73/45.4 | |
| 4,768,372 A * | 9/1988 | Lehmann | B07C 5/3408 | |
| | | | 73/49.2 | |
| 4,852,415 A * | 8/1989 | Bogatzki | B07C 5/3408 | |
| | | | 73/865.8 | |
| 4,942,758 A * | 7/1990 | Cofield | G01M 3/3254 | |
| | | | 702/47 | |
| 4,953,396 A * | 9/1990 | Langsdorf | G01M 3/02 | |
| | | | 73/45.4 | |
| 5,309,750 A * | 5/1994 | Riley | G01M 3/3218 | |
| | | | 73/49.3 | |
| 5,591,899 A * | 1/1997 | Griesbeck | B07C 5/3404 | |
| | | | 250/223 B | |
| 5,767,392 A * | 6/1998 | Belcher | G01M 3/36 | |
| | | | 73/41 | |
| 5,880,359 A * | 3/1999 | Kono | G01M 3/3209 | |
| | | | 73/49.3 | |
| 5,939,620 A | 8/1999 | Strand | | |
| 6,427,524 B1 * | 8/2002 | Raspante | G01M 3/3218 | |
| | | | 73/45.4 | |
| 6,473,169 B1 * | 10/2002 | Dawley | G01M 3/3263 | |
| | | | 250/223 B | |
| 6,666,071 B1 * | 12/2003 | McCormick | G01M 3/3209 | |
| | | | 73/41 | |
| 7,040,167 B2 * | 5/2006 | Hayward | G01N 29/045 | |
| | | | 425/169 | |
| 7,455,514 B2 * | 11/2008 | Netsu | B29C 49/06 | |
| | | | 198/377.03 | |
| 7,541,556 B2 * | 6/2009 | Canepa | B07C 5/3404 | |
| | | | 209/524 | |
| 7,559,232 B2 * | 7/2009 | Meckl | G01M 3/34 | |
| | | | 198/478.1 | |
| 7,736,590 B2 * | 6/2010 | Matsuda | G01N 21/6408 | |
| | | | 422/82.08 | |
| 8,939,642 B2 * | 1/2015 | Ackerman | B65D 21/0233 | |
| | | | 383/105 | |
| 8,973,425 B2 * | 3/2015 | Dzikowicz | G01M 3/40 | |
| | | | 73/49.3 | |
| 9,518,891 B2 * | 12/2016 | Subhash | G01M 3/366 | |
| 9,606,018 B2 * | 3/2017 | Botterbrodt | G01M 3/02 | |
| 9,927,409 B2 * | 3/2018 | Polman | G01M 3/363 | |
| 10,144,545 B2 * | 12/2018 | Bianchi | B65G 43/10 | |
| 10,421,620 B2 * | 9/2019 | Bianchi | B65B 43/50 | |
| 2003/0216235 A1 | 11/2003 | Resterhouse | | |
| 2006/0219609 A1 * | 10/2006 | Canepa | G01M 3/34 | |
| | | | 209/552 | |
| 2007/0212255 A1 * | 9/2007 | Brombin | B67C 7/0073 | |
| | | | 422/27 | |
| 2008/0060421 A1 * | 3/2008 | Muller | G01M 3/229 | |
| | | | 73/49.2 | |
| 2008/0072658 A1 * | 3/2008 | Meckl | G01M 3/34 | |
| | | | 73/45.3 | |
| 2010/0326562 A1 * | 12/2010 | Sheehy | B65B 43/54 | |
| | | | 141/10 | |
| 2013/0111972 A1 * | 5/2013 | Subhash | G01M 3/3263 | |
| | | | 73/12.01 | |
| 2014/0110222 A1 * | 4/2014 | Prieto Male | B65G 29/00 | |
| | | | 198/470.1 | |
| 2014/0193897 A1 * | 7/2014 | Dahlberg | G01M 3/22 | |
| | | | 435/297.1 | |
| 2014/0352409 A1 * | 12/2014 | Botterbrodt | G01M 3/16 | |
| | | | 73/49.3 | |
| 2015/0328855 A1 * | 11/2015 | Honda | B29C 66/43121 | |
| | | | 53/403 | |
| 2017/0283103 A1 * | 10/2017 | Bianchi | B65G 43/10 | |
| 2018/0127192 A1 * | 5/2018 | Cohen | G07F 13/06 | |
| 2018/0290838 A1 * | 10/2018 | Bianchi | B65G 47/847 | |
| 2020/0270003 A1 * | 8/2020 | Wittorf | A61J 1/10 | |

FOREIGN PATENT DOCUMENTS

| | | | | |
|---|---|---|---|---|
| GB | 1541671 A * | 3/1979 | G01M 3/3281 |
| GB | 2222687 A * | 3/1990 | B07C 5/3408 |
| GB | 2415385 A | 12/2005 | |
| JP | 200035373 A * | 2/2002 | |
| WO | WO-2010147325 A3 * | 3/2011 | G01M 3/3281 |
| WO | 2016034956 A1 | 3/2016 | |

OTHER PUBLICATIONS

"ASTM F2095—07e1 Standard Test Methods for Pressure Decayu Leak Test for Flexible Packages With and Without Restraining Plates", Annual Book of ASTM Stand, ASTM International, Jan. 1, 2007, vol. 15, No. 10, pp. 1-6, XP008096350.

International Search Report dated Oct. 9, 2017 re: Application No. PCT/IB2017/054539, pp. 1-4, citing: EP 2 213 997 A1, ASTM F2095 . . . , U.S. Pat. No. 4 019 370 A, U.S. Pat. No. 5 939 620 A and GB 2 415 385 A.

IT Search Report dated Jun. 1, 2017 re: Application No. IT 201600079175, pp. 1-2, citing: EP 2 213 997 A1, U.S. Pat. No. 4 019 370 A, ASTM F2095 . . . , U.S. Pat. No. 5 939 620 A and GB 2 415 385 A.

Written Opinion dated Oct. 9, 2017 re: Application No. PCT/IB2017/054539, pp. 1-11, citing: U.S. Pat. No. 5 939 620 A and GB 2 415 385 A.

* cited by examiner

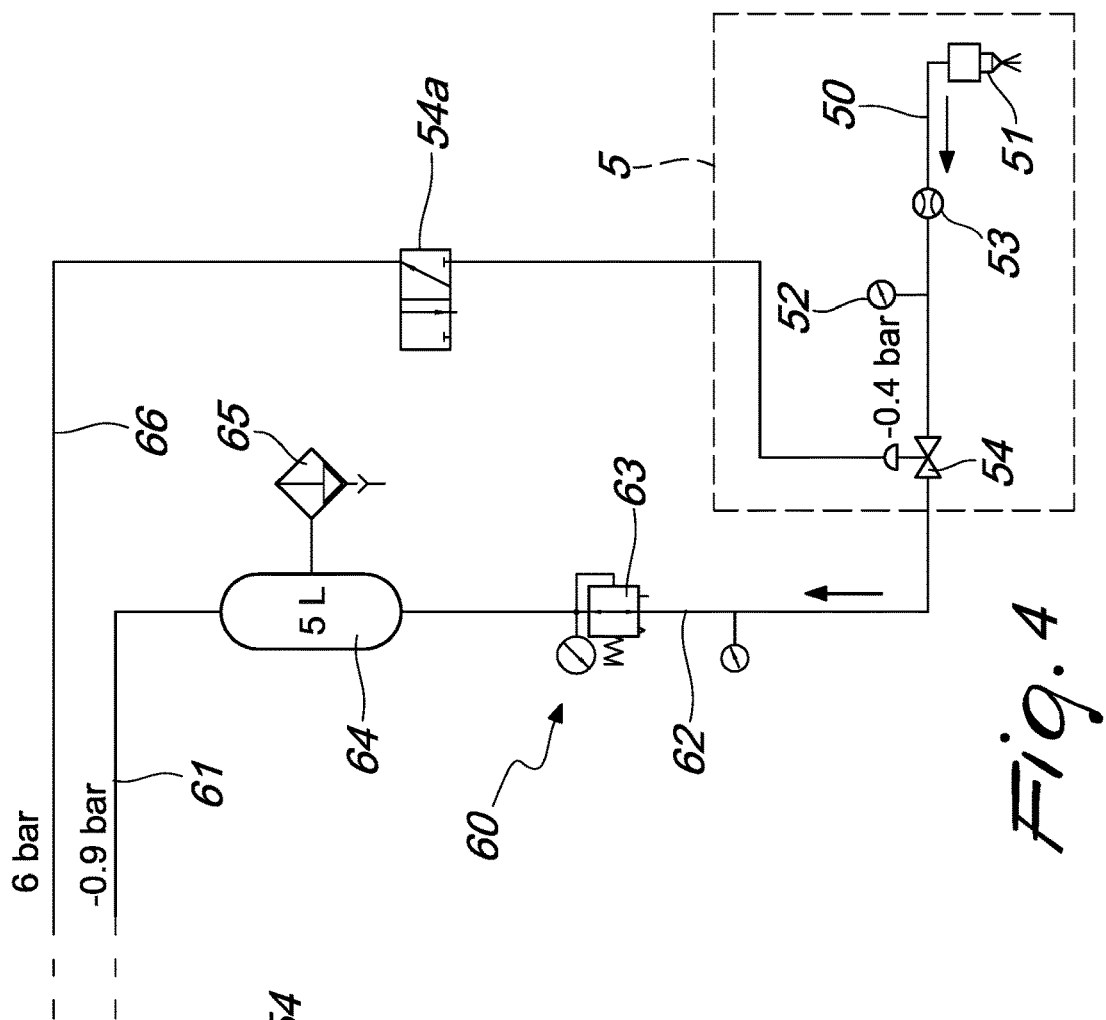
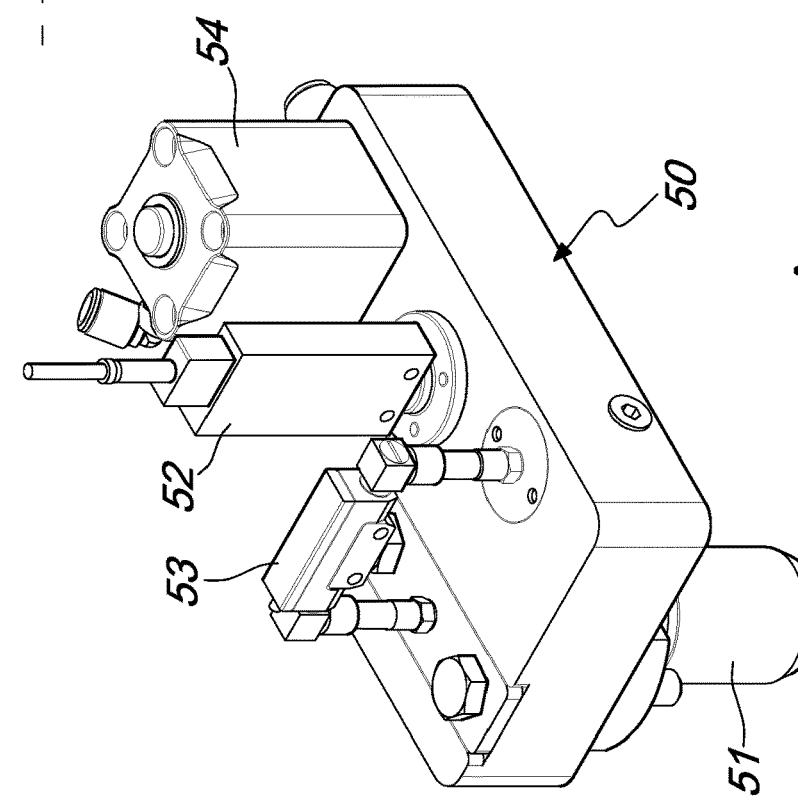
Fig. 4
Fig. 3

DEVICE AND METHOD FOR CHECKING POUCHES FOR FILLING LINES

TECHNICAL FIELD

The present disclosure relates to a device and a method for checking pouches for filling lines, particularly pouches of containers for liquids, purées or powders. The disclosure also relates to a filling line that contains said device.

BACKGROUND

Flexible containers are known which consist essentially of a sealed pouch used to contain liquids, powders or purées, for example juices or purées of fruit or energy beverages. This flexible pouch can be heat-sealed to a rigid spout, which is then plugged and can be such as to stand on its own, in which case it is usually termed DOYPACK™ stand-up pouch.

It is known to use plastic and metallic films, for example made of aluminum, to provide these pouches in order to form a barrier against external light and oxygen. These films have such a thickness that typically the walls of the pouch have a thickness of less than approximately 1 mm.

Lines for the continuous filling of these pouches of the rotary type are known and for example comprise a plurality of carousels to pick up pouches from a magazine, fix a spout to each pouch, fill the pouch with a beverage or purée through the spout, plug the spout and release the container thus obtained.

One drawback of the background art is that it is not possible to check, except visually, for any defects of the pouches, in particular for the presence of any holes that can compromise oxygen tightness and consequently cause the deterioration of the content of the pouch.

Furthermore, another drawback is that the pouches, typically provided in a flattened configuration to the filling line, can in isolated cases fail to open completely, in which case filling with the intended dose of product can cause an overflow of said product out of the spout and/or the pouch.

SUMMARY

The aim of the present disclosure is to provide a device and a method that are capable of improving the background art in one or more of the aspects indicated above.

Within this aim, the disclosure provides a device and a method for checking pouches for filling lines that allows to determine the presence of holes on the side walls of the pouches.

The disclosure also provides a device and a method for checking pouches for filling lines that allows to check the complete opening of the pouch before its filling.

Moreover, the present disclosure avoids the filling of defective pouches within a filling line of flexible containers such as DOYPACK™ stand-up pouches and the like.

Furthermore, the present disclosure overcomes the known drawbacks in an manner which is alternative to any existing solutions.

The disclosure provides a device and a method for checking pouches for filling lines that is highly reliable, relatively easy to provide and at competitive costs.

This aim, as well as these and other advantages which will become better apparent hereinafter, are achieved by providing a device for checking pouches adapted to contain a substance such as a liquid, a powder or a purée, comprising at least one carousel adapted to convey the pouches, supporting them along the peripheral region of the carousel, characterized in that said device comprises at least one duct for supplying a test fluid that is connected to at least one nozzle insertable in a respective pouch conveyed by said carousel, said device further comprising means for detecting a variation in the pressure and/or flow rate of the test fluid in said at least one duct after the test fluid has been supplied to, or drawn from, said pouch through said at least one duct and said at least one nozzle.

Preferably, the test fluid is a gas and said at least one duct comprises a first valve that is adapted to open or close the passage of said test fluid between said nozzle and a pressurized line, said device further comprising first means for actuating the closure of said first valve after the test fluid has been fed or drawn from said supply duct and by means of a relative pressure that is different from zero and is induced by said pressurized line, said detection means being adapted to detect said pressure and/or flow rate variation of the test fluid in said duct between said nozzle inserted hermetically in the respective pouch and said first valve in the closed state.

The aim and objects of the disclosure are achieved also by a method for checking pouches adapted for the hermetic containment of a substance such as a liquid, a powder or a purée, including the following steps:

feeding in sequence a plurality of pouches to a rotatable carousel on which multiple nozzles are mounted along its peripheral region and are connected to a respective duct for supplying a test fluid;

conveying the pouches supported along the peripheral region of the carousel and with the nozzles inserted hermetically in the pouches, unloading the conveyed pouches from the carousel;

characterized in that said conveyance step comprises the steps of:

introducing or drawing a test fluid through at least one of said supply ducts and the corresponding nozzle inserted hermetically in the pouch;

checking a variation in the pressure and/or flow rate of the test fluid in said supply duct after said introduction or withdrawal step.

Preferably, the test fluid is a gas and the supply duct comprises a first valve that is adapted to open or close the passage of said test fluid between said nozzle and a pressurized line, wherein said method comprises the step of actuating the closure of said first valve after the test fluid has been supplied or drawn from said supply duct and by means of a relative pressure that is different from zero and is induced by said pressurized line, said checking of the pressure and/or flow rate variation of the test fluid in said duct being performed between said nozzle inserted hermetically in the respective pouch and said first valve in the closed state.

BRIEF DESCRIPTION OF THE DRAWINGS

Further characteristics and advantages of the disclosure will become better apparent from the description of preferred but not exclusive embodiments of the device and of the method according to the disclosure, illustrated by way of nonlimiting example in the accompanying drawings, wherein:

FIG. 3 is a perspective view of a pneumatic circuit and of a nozzle used in the first embodiment of FIG. 1;

FIG. 4 is the diagram of the pneumatic circuit of the preceding figure;

DETAILED DESCRIPTION OF THE DRAWINGS

Figure 1:
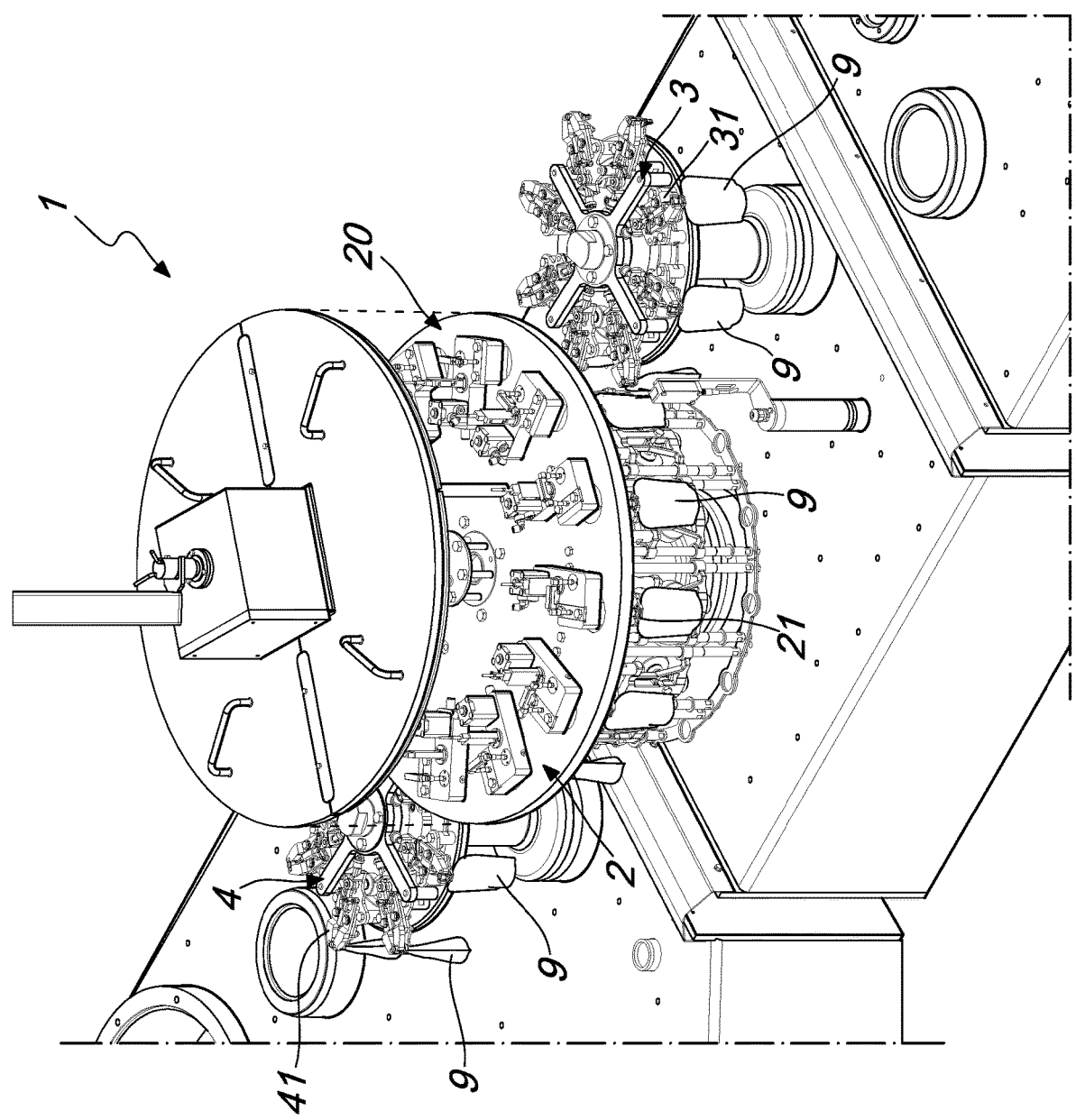
FIG. 1 is a perspective view of a device for checking pouches for pouch filling lines according to a first embodiment of the disclosure.
Figure 2:
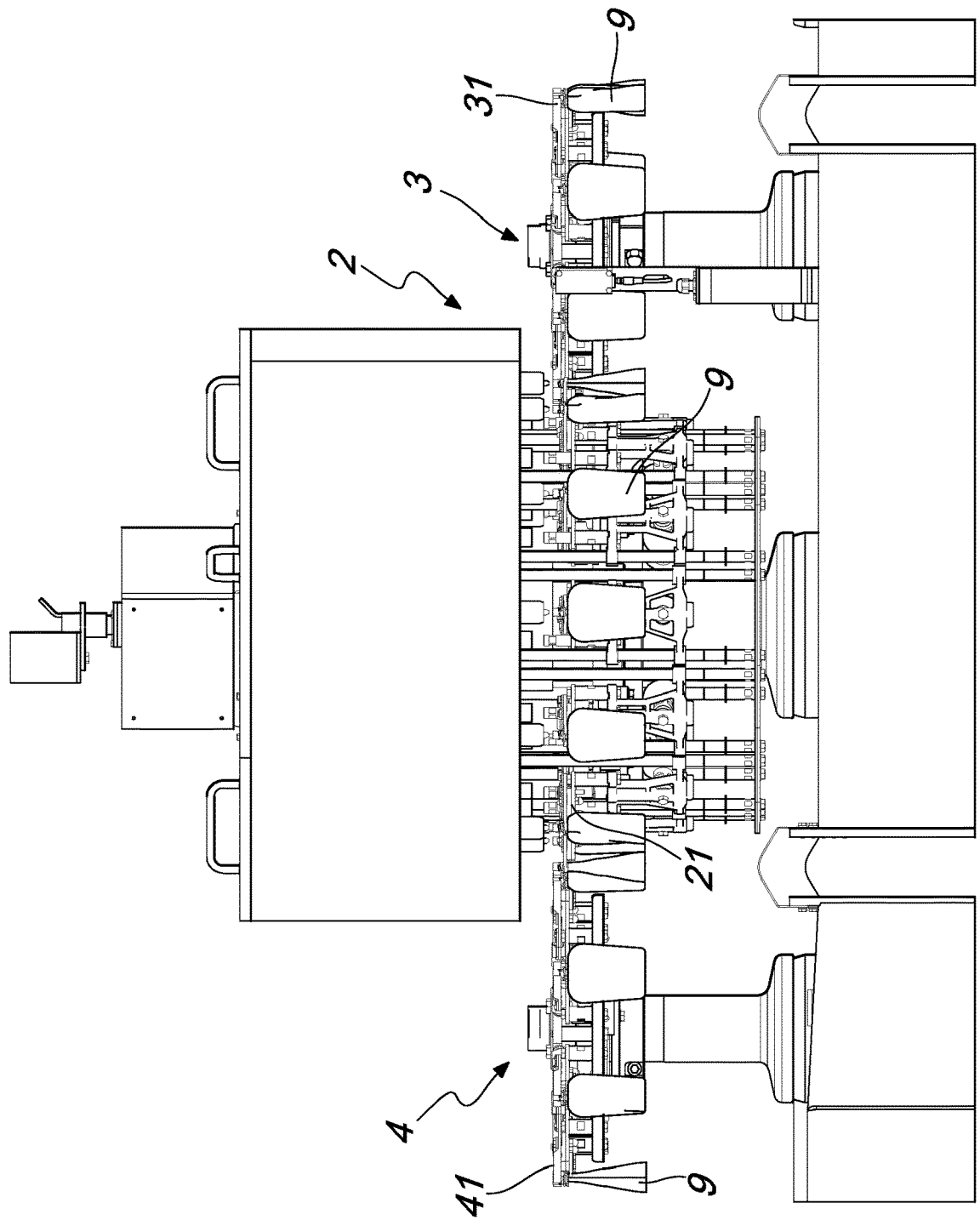
FIG. 2 is a side view of the device of the preceding figure.
Figure 5:
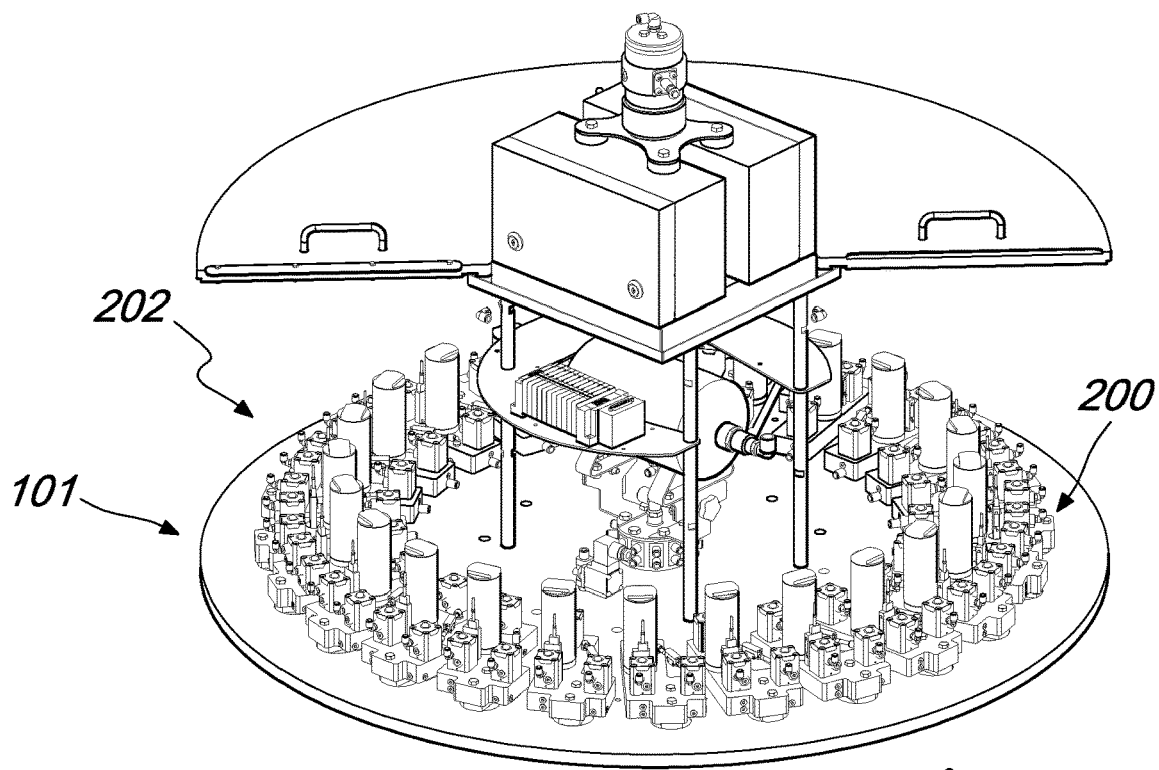
FIG. 5 is a perspective view of the carousel of a pouch checking device for pouch filling lines according to a second embodiment of the disclosure.
Figure 6:
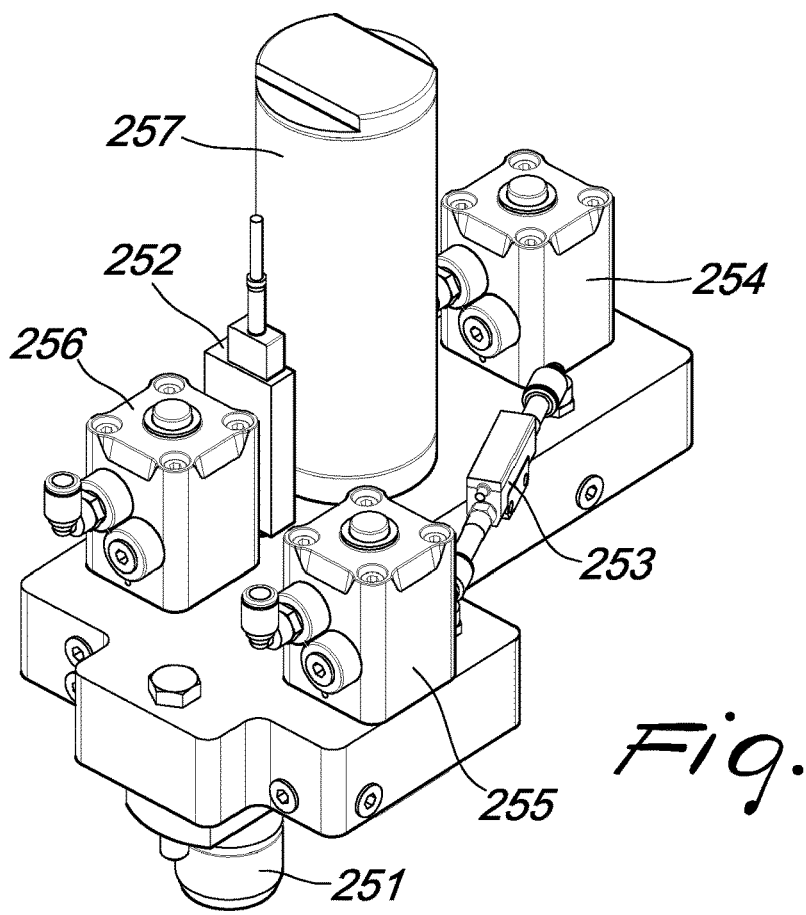
FIG. 6 is a perspective view of a pneumatic circuit and of a nozzle used in the preceding figure.
Figure 7:
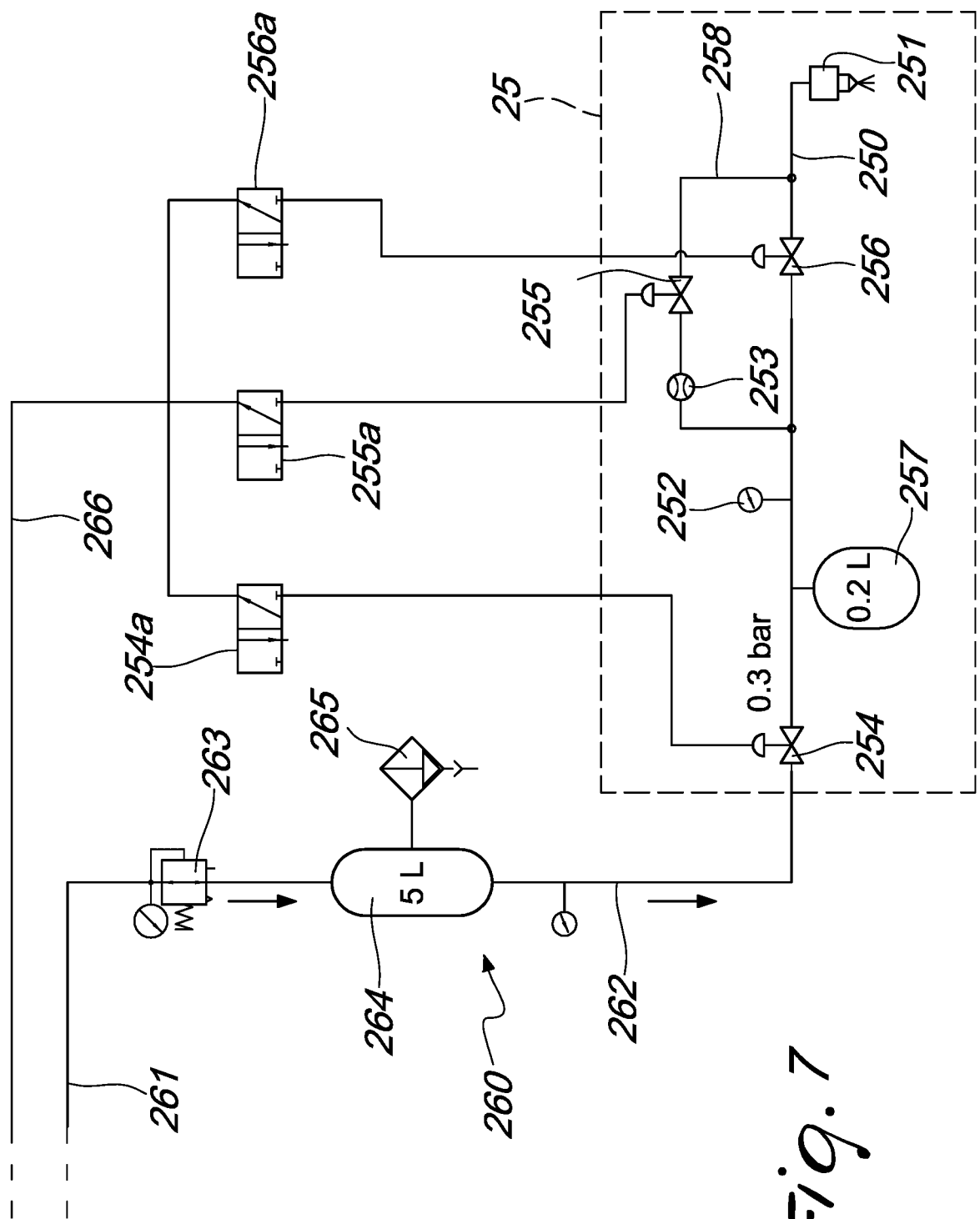
FIG. 7 is the diagram of the pneumatic circuit of the preceding figure.

With reference to the FIGS. 1-7, the device according to the disclosure, designated generally by the reference numeral 1, 101 depending on the embodiment described, is specifically aimed at checking pouches adapted to contain a substance such as a liquid, a powder or a purée, for example DOYPACK™ stand-up pouches and similar flexible containers. For example, the liquid, the powder and the purée can be food products, such as beverages, fruit purées, and the like.

The device 1, 101 comprises at least one pouch checking carousel 2, 202 adapted to convey the pouches 9, supporting them along its peripheral region 20, 200 during the rotation of the carousel about its own central axis.

The carousel 2, 202 rotates preferably continuously and therefore can be used in a filling line which operates continuously, particularly a rotary line.

The pouches 9 are preferably provided with a rigid spout, which is heat-sealed in a known manner inside the open flaps of the pouch in a preceding step, for example in a heat-sealing carousel of the known type arranged upstream of the checking carousel 2, 202 along the filling line. A heat-sealing carousel of this type is known for example from U.S. patent application Ser. No. 10/260,009.

Upstream of the heat-sealing carousel, not shown, there are means for extracting pouches and nozzles from respective magazines, also of a known type, which are adapted to provide pouches and spouts to the heat-sealing carousel. Examples of these extraction means are described in the same U.S. patent application Ser. No. 10/260,009 or in international application no. PCT/IB2015/055686.

The filling line comprising the device 1 comprises, downstream of the checking carousel 2, 202, a filling carousel, not shown, which in a known manner is adapted to fill with the desired substance the pouches 9 after they have been checked by the device 1, 101. The substance can be a liquid, a powder or a purée, for example a beverage or a purée of fruit. The filling performed by the filling carousel can be with contact or contactless.

In filling with contact, a filling tap is inserted in the spout, while in contactless filling the tap remains distant from the spout.

When filling with contact is performed, the pouches 9 must reach the filling carousel in an emptied state, otherwise the tap, which typically is provided with a gasket, would prevent the air that is present in the pouch from exiting once it has been inserted in the spout and would therefore cause a filling problem.

When contactless filling is performed, it is instead preferable for the pouches 9 to be fed to the filling carousel already inflated, i.e., with the internal walls clearly mutually separated, in order to facilitate the entry of the substance to be introduced from the tap into the pouch without having to overcome any resistance of a flattened pouch with the walls flattened against each other.

The device 1, 101 according to the disclosure can be used in both of these filling situations. In particular, the first embodiment of the disclosure is particularly suitable for subsequent contactless filling, whereas the second embodiment of the disclosure is adapted for subsequent filling with contact.

In order to receive in input and provide in output the pouches 9, there is an input carousel 3 and an output carousel 4 directly upstream and downstream of the checking carousel 2. Similar input and output carousels (not shown) are provided upstream and downstream of the checking carousel 202 of the second embodiment.

The carousels 2, 3 and 4 can be provided with grip clamps 21, 31, 41 which are fixed along the entire respective peripheral region and are adapted to grip by the neck the spout fixed to the pouches 9.

Additionally or as an alternative, the grip clamps of the carousels 2, 3, 4 can be adapted to retain laterally and/or from below the body of the pouch 9.

The carousel 202 also is provided with grip clamps like the first embodiment.

Nozzles 51, 251 are further fixed along the peripheral region 20, 200 of the pouch checking carousel 2, 202 and are arranged coaxially with respect to the grip clamps 21 so as to be aligned with the spout of the respective pouch 9 when it is conveyed by the checking carousel 2 toward the output carousel 4.

Furthermore, the carousel 2, 202 is provided with means for mutually moving the pouches 9 conveyed by the carousel 2, 202 and the respective nozzles 51, 251, so as to allow the hermetic insertion of the nozzles 51, 251 in the respective pouch 9, particularly in its spout. These means can comprise, for example, a piston which is configured to move axially a respective grip clamp 21 toward the respective nozzle 51.

A respective duct 50, 250 for feeding a test fluid, particularly a gas such as air or nitrogen, is connected to each nozzle 51, 251. Said test fluid can be injected into the pouch 9 in which the nozzle is inserted hermetically or can be aspirated by the pouch, depending on the embodiment.

The device 1, 101 according to the disclosure further comprises means 5, 25 for detecting a variation in the pressure and/or flow rate of the test fluid in the supply duct 50, 250 with respect to a respective expected value after the test fluid has been provided to, or drawn from, the respective pouch 9 through the duct 50, 250 and the nozzle 51, 251.

The detection means can comprise a pressure detector 52, 252, for example a pressure gauge, and/or a flow detector 53, 253, for example a flow control switch.

In the first embodiment, the test fluid is air and is drawn from the pouch 9 through the nozzle 51 and the duct 50, which are connected to a line 60 that is pressurized, in particular at a negative relative pressure, which is adapted to create a partial vacuum in the duct 50 and consequently in the pouch 9 connected hermetically to the nozzle 51, with respect to atmospheric pressure.

The pressurized line 60 can comprise a common intake line 61 in partial vacuum, for example at a relative pressure of −0.9 bar, and a plurality of lines 62 at a regulated pressure, for example at a relative pressure value comprised between −0.25 bar and −0.5 bar, for example −0.4 bar, obtained by means of a respective pressure regulator 63.

The regulated pressure lines 62 are provided one for each supply duct 50 and all lead to a first common tank 64, with a capacity equal for example to 5 liters.

The first tank 64, which has essentially a stabilizing function, is preferably associated with a dehumidifier 65. The pressurized line 60 is therefore suitable to convey the test fluid from the nozzles 51 toward the first tank 64, emptying the pouches 9 conveyed by the checking carousel 2 of any air present therein.

In order to detects a pressure and/or flow rate variation of the air in the duct 50 with respect to a respective expected value, along the supply duct 50 there is advantageously a first valve 54, which is adapted to allow/prevent the passage of the test fluid between the nozzle 51 and the pressurized line 60.

The first valve 54 is preferably of the on/off type and is connected to first means to actuate its closure after the test fluid has been drawn from the pouch 9 through the duct 50 and by means of a pressure drop induced by the pressurized line 60. In the illustrated case, the first valve 54 can be actuated pneumatically.

The first means for actuating the opening/closure of the first valve 54 can comprise a first pneumatic actuation valve 54a, for example of the 3/2 type, which is actuated electrically by an electric control circuit, such as a PLC (not shown), which is conveniently programmed so as to implement the method according to the disclosure.

The first pneumatic actuation valve 54a is used to open/close the first on/off valve 54 by connecting/disconnecting it with respect to a second pressurized line 66, for example at a relative pressure of 6 bar, which can be a line that is already present in the filling line.

The operation of the first embodiment is as follows.

After or while the nozzle 51 is inserted hermetically in the pouch 9 fed by the input carousel 3 to the checking carousel 2, in particular in the spout of said pouch, the first valve 54 is kept open, so as to depressurize the supply duct 50, making it reach an internal relative pressure that is equal to the pressure regulated by the pressurized line 60, for example at −0.4 bar of relative pressure. In this manner, the pouch 9 is completely emptied of any air that is present therein.

The first valve is kept open for a preset time, adapted to empty the pouch 9, for example 0.15 seconds.

Then, by means of the first actuation valve 54a, the first valve 54 is closed and, for a preset time that depends on the precision that one wishes to have, the presence of a flow detected by the flow control switch 53, i.e., of a variation with respect to the expected value equal to zero, is checked. A satisfactory time for checking after closure of the first valve 54 can be 1.5 seconds or more.

If there is a flow, i.e., a variation with respect to a nil flow, the PLC control circuit determines that there is a leak in the pouch 9 associated with that particular duct 50 and nozzle 51 and therefore the position of said pouch along the filling line is reported by the PLC to the components downstream of the carousel 2, so as to prevent its filling and/or allow its rejection.

Otherwise the pouch 9 proceeds normally along the filling line.

Optionally, if a flow variation is not detected, the PLC control circuit of the device 1 checks, by means of the pressure gauge 52, whether there is a pressure variation with respect to the expected pressure value in the duct 50, which would be the value previously set by the line 60 when the first valve 54 was open, for example −0.4 bar of relative pressure.

In the second embodiment, the test fluid is preferably nitrogen, since it allows to avoid the oxidation of the pouches 9. However, as an alternative to nitrogen it is also possible to use air or another gas.

In this case, the test fluid is injected into the pouch 9 through a respective duct 250 and a respective nozzle 251 of the plurality of nozzles fixed along the entire peripheral region 200 of the checking carousel 202.

The nozzles 251 and the ducts 250 are connected to a pressurized line 260, in particular at positive relative pressure, which is adapted to pressurize the duct 250 and consequently the pouch 9 connected hermetically to the nozzle 251 to a value that is higher than atmospheric pressure.

The pressurized line 260 can comprise a common pressurized intake line 261 and a plurality of regulated pressure lines 262, for example at a relative pressure value of 0.3 bar, which is obtained by means of a respective pressure regulator 263.

The lines at regulated pressure 262 are preferably provided one for each supply duct 250 and all lead to a first common tank 264, with a capacity equal for example to 5 liters.

The first tank 264, which essentially has a stabilizing function, is preferably associated with a dehumidifier 265. The pressurized line 260 is therefore adapted to convey the test fluid from the first tank 264 toward the supply ducts 250.

Along the supply ducts 250 there is a plurality of second tanks 257, each connected to a respective duct 250 and having a known capacity, such as to be able to define a preset ratio with the internal volume of the respective pouch 9 to be tested.

For example, each second tank 257 can have a capacity equal to twice the internal volume of the pouch 9, i.e., 0.2 liters in the case of a 0.1-liter pouch.

Advantageously, the second tank 257 can be uncoupled easily from the carousel 202 and can be replaced with a tank having a different capacity if the type of pouch 9 to be tested changes.

In order to detect a variation of the pressure and/or flow rate of the air in the duct 250, advantageously along the supply duct 250 there is a first valve 254, which is adapted to allow/prevent the passage of the test fluid between the nozzle 251 and the pressurized line 260.

The second tank 257 is connected to the respective duct 250 in a point that is comprised between the nozzle 251 and the first valve 254, so that when the first valve 254 is opened both the second tank 257 and the pouch 9 connected hermetically to the nozzle 251 are pressurized. Since the capacity of the second tank has a preset ratio with the internal volume of the pouch 9 and the pressure is set initially by the line 260, by the law of perfect gases the pressure inside the second tank and the pouch has a known expected value.

Like in the first embodiment, the first valve 254 is preferably of the on/off type and is connected to first means for actuating its closure after the test fluid has been drawn from the pouch 9 through the duct 250 and by means of a pressure drop induced by the pressurized line 260. In the illustrated case, the first valve 254 can be actuated pneumatically.

The first means for actuating the opening/closure of the first valve 254 can comprise a first pneumatic actuation valve 254a, for example of the 3/2 type, which is actuated electrically by an electrical control circuit, such as a PLC (not shown), which is conveniently programmed so as to implement the method according to the disclosure.

The first pneumatic actuation valve 254a is used to open/close the first on/off valve 254, connecting it/disconnecting it with respect to a second pressurized line 266, for example at 9 bar of relative pressure, which can be a line that is already present in the filling line.

Furthermore, there is a pressure detector, for example a pressure gauge 252, and/or a flow detector, for example a flow control switch 253, the latter being arranged along a second duct 258 which bypasses the supply duct 250 between the nozzle 251 and the second tank 257 and comprises a second valve 255 in order to prevent the passage of the test fluid in the second duct 258 and then in the flow detector. The second valve 255, of the on/off type, is actuated by a second pneumatic actuation valve 255a, for example of the 3/2 type, which is connected to the second pressurized line 266 and is actuated electrically by the PLC circuit of the second embodiment.

Furthermore, it is preferred to use a third valve 256, which is kept closed, by means of a third pneumatic actuation valve 256a, when the first valve 254 is in the open state, so as to pressurize only the second tank 257 to the relative pressure value of the line 262, for example +0.3 bar.

The operation of the second embodiment is as follows.

After or while the nozzle 251 is inserted hermetically within the pouch 9 fed by the input carousel 3 to the checking carousel 202, in particular inside the spout of said pouch, the first valve 254 is kept open and the second and third valves 256 are kept closed, so as to pressurize the supply duct 250 and the second tank 257, making the latter reach a relative internal pressure that is higher than the atmospheric pressure and is substantially equal to the pressure regulated by the pressurized line 260, for example at +0.3 bar of relative pressure.

Then the first valve 254 is closed and the third valve 256 is opened for a certain preset time interval. Since the internal volume of the pouch 9 and the capacity of the second tank 257 are known beforehand, by the law of perfect gases the expected internal pressures of the second tank 257 and of the pouch 9 are known.

If, by closing the third valve 256 again, the pressure gauge 252 detects a pressure that is different from the expected one, by the law of perfect gases this indicates that the internal volume of the pouch 9 is not the expected one, since the internal pressure of the second tank is not what it should be.

For example, with a second 0.2-liter tank, a 0.1-liter pouch 9 and a relative pressure of 0.3 bar of the line 262, the pressure gauge should detect a pressure of 0.15 bar in the second tank 257.

If the detected pressure value is not the expected one, this is considered by the device 101 according to the disclosure, in particular by its PLC control circuit, as an indicator of an incomplete opening of the pouch 9, which is therefore unable to receive the expected quantity of substance in the downstream filling carousel. The position of the pouch 9 along the filling line is then reported by the PLC to the downstream components of the carousel 202, so as to prevent the filling of said pouch and/or allow its rejection.

Then, again with the third valve 256 closed, it is possible to open the second valve 255 for a preset time, so as to allow the flow control switch 253 to check for the presence of a flow, i.e., a flow rate variation, between the nozzle 251 and the second tank 257. In the presence of such a variation, a leak in the pouch 9 is confirmed and its position along the filling line is therefore reported by the PLC to the downstream components of the carousel 202, so as to prevent its filling and/or allow its rejection.

In practice it has been found that the device and the method according to the disclosure achieve fully the intended aim, since they allow to check the tightness and/or complete opening of pouches for flexible containers such as DOYPACK™ stand-up pouches and the like prior to their filling.

Although the device according to the disclosure has been conceived in particular for continuous rotary lines, it can in any case be used also in stepwise filling lines.

The device thus conceived is susceptible of numerous modifications and variations, all of which are within the scope of the appended claims; all the details may further be replaced with other technically equivalent elements.

In practice, the materials used, as well as the dimensions, may be any according to the requirements and the state of the art.

The disclosures in Italian Patent Application no. 102016000079175, from which this application claims priority, are incorporated herein by reference.

The invention claimed is:

1. A device for checking pouches adapted to contain a substance such as a liquid, a powder or a purée, comprising at least one carousel adapted to convey the pouches, supporting the pouches along the peripheral region of the carousel, the device comprising at least one duct for supplying a test fluid that is connected to at least one nozzle insertable in a respective pouch conveyed by said carousel, said device further comprising means for detecting a variation, with respect to an expected value, in the pressure and/or flow rate of the test fluid in said at least one duct after the test fluid has been supplied to, or drawn from, said pouch through said at least one duct and said at least one nozzle, wherein said test fluid is a gas and wherein said at least one duct comprises a first valve that is adapted to open or close the passage of said test fluid between said nozzle and a pressurized line, said device further comprising first means for actuating the closure of said first valve after the test fluid has been fed or drawn from said supply duct and by means of a relative pressure that is different from zero and is induced by said pressurized line, said detection means being adapted to detect said pressure and/or flow rate variation of the test fluid in said duct between said nozzle inserted hermetically in the respective pouch and said first valve in the closed state, wherein said device further comprises a plurality of second tanks, each connected to a respective duct of a plurality of said ducts, each of said second tanks having a capacity that has a predefined ratio with respect to the internal volume of said respective pouch.

2. The device according to claim 1, wherein said device comprises a plurality of said nozzles, so as to check simultaneously a plurality of pouches conveyed by said carousel, said nozzles being arranged on the peripheral region of said carousel.

3. The device according to claim 1, further comprising a first tank of said test fluid, said first tank being connected to said at least one duct and to said pressurized line adapted to convey said test fluid from or toward said tank respectively toward or from said at least one supply duct.

4. The device according to claim 1, wherein said pressurized line is a pressurized line such as to draw said test fluid from the pouch through said nozzle and said supply duct.

5. The device according to claim 1, wherein each second tank is connected to the respective duct in a point comprised between said nozzle and said first valve.

6. The device according to claim 5, wherein said detection means comprise a pressure detector and/or a flow detector, said flow detector being arranged at a second duct that bypasses said supply duct between said nozzle and said second tank and in that it comprises a second valve to prevent the passage of said test fluid in said second duct.

7. The device according to claim 6, wherein said supply duct comprises a third valve between said nozzle and said second tank, said pressure detector being connected to said supply duct between said first valve and said third valve, said device further comprising third means for actuating the opening and closure of said third valve, said device being configured to:
- open said first valve and close said third valve so as to supply said test fluid only to said second tank at a predetermined pressure;
- subsequently, closing said first valve and opening said third valve in order to distribute said test fluid between said second tank and the internal volume of said pouch in which the nozzle is inserted; and
- closing said third valve so that said pressure detector measures the pressure in said second tank, said detection means being configured to compare the measurement of the pressure thus taken with an expected pressure value that depends on the expected internal volume of said pouch.

8. A rotary line for filling pouches for the hermetic containment of a substance such as a liquid, a powder or a purée, said line comprising at least one filling carousel for receiving an empty pouch, injecting said substance and releasing the pouch filled with said substance, and further comprising, upstream of the filling carousel, a device for checking pouches according to claim 1.

9. A method for checking pouches adapted for the hermetic containment of a substance such as a liquid, a powder or a purée, the method including the following steps:
- feeding in sequence a plurality of pouches to a rotatable carousel on which multiple nozzles are mounted along a peripheral region thereof and are connected to a respective duct for supplying a test fluid;
- conveying the pouches supported along the peripheral region of the carousel and with the nozzles inserted hermetically in the pouches,
- unloading the conveyed pouches from the carousel;
wherein said conveyance step comprises the steps of:
- introducing or drawing a test fluid through at least one of said supply ducts and the corresponding nozzle inserted hermetically in the pouch;
- checking a variation in the pressure and/or flow rate of the test fluid, with respect to an expected value, in said supply duct after said introduction or withdrawal step,
wherein said test fluid is a gas and wherein said duct comprises a first valve that is adapted to open or close the passage of said test fluid between said nozzle and a pressurized line, wherein said method comprises the step of actuating the closure of said first valve after the test fluid has been supplied or drawn from said supply duct and by means of a relative pressure that is different from zero and is induced by said pressurized line, said checking of the pressure and/or flow rate variation of the test fluid in said duct being performed between said nozzle inserted hermetically in the respective pouch and said first valve in the closed state, wherein said pressure is such as to empty said pouch, wherein said method further includes the following steps:
- depressurizing said duct by keeping open said first valve, with consequent emptying of said pouch,
- closing the first valve for a predefined time, and
- checking whether there is a flow rate variation in said supply duct while said first valve is closed.

10. The method according to claim 9, further comprising a step of checking whether there is a variation in pressure in said supply duct with respect to the pressure of said pressurized line.

11. The method according to claim 9, wherein said supply duct is also connected to a second tank, said second tank having a capacity that has a predefined ratio with respect to the internal volume of said pouch, said method further including the following steps:
- pressurizing said second tank while keeping open said first valve, consequently reaching the value of the pressure of the pressurized line inside said second tank, and
- closing the first valve and opening a third valve between said second tank and said nozzle, in order to fill said pouch with a known volume of gas that depends on said ratio,
- while said first valve is closed, checking whether there is a pressure and/or flow rate variation in said supply duct between said second tank and said nozzle inserted hermetically in the pouch.

12. A method for checking pouches adapted for the hermetic containment of a substance such as a liquid, a powder or a purée, the method including the following steps:
- feeding in sequence a plurality of pouches to a rotatable carousel on which multiple nozzles are mounted along a peripheral region thereof and are connected to a respective duct for supplying a test fluid;
- conveying the pouches supported along the peripheral region of the carousel and with the nozzles inserted hermetically in the pouches,
- unloading the conveyed pouches from the carousel;
wherein said conveyance step comprises the steps of:
- introducing or drawing a test fluid through at least one of said supply ducts and the corresponding nozzle inserted hermetically in the pouch;
- checking a variation in the pressure and/or flow rate of the test fluid, with respect to an expected value, in said supply duct after said introduction or withdrawal step,
wherein said test fluid is a gas and wherein said duct comprises a first valve that is adapted to open or close the passage of said test fluid between said nozzle and a pressurized line, wherein said method comprises the step of actuating the closure of said first valve after the test fluid has been supplied or drawn from said supply duct and by means of a relative pressure that is different from zero and is induced by said pressurized line, said checking of the pressure and/or flow rate variation of the test fluid in said duct being performed between said nozzle inserted hermetically in the respective pouch and said first valve in the closed state,
wherein said supply duct is also connected to a second tank, said second tank having a capacity that has a predefined ratio with respect to the internal volume of said pouch, said method further including the following steps:
- pressurizing said second tank while keeping open said first valve, consequently reaching the value of the pressure of the pressurized line inside said second tank, and
- closing the first valve and opening a third valve between said second tank and said nozzle, in order to fill said pouch with a known volume of gas that depends on said ratio,
- while said first valve is closed, checking whether there is a pressure and/or flow rate variation in said supply duct between said second tank and said nozzle inserted hermetically in the pouch.

* * * * *